US010417392B2

(12) United States Patent
Farrugia et al.

(10) Patent No.: US 10,417,392 B2
(45) Date of Patent: *Sep. 17, 2019

(54) DEVICE-INDEPENDENT MANAGEMENT OF CRYPTOGRAPHIC INFORMATION

(75) Inventors: Augustin J. Farrugia, Cupertino, CA (US); Gianpaolo Fasoli, Palo Alto, CA (US); Jean-Francois Riendeau, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 1069 days.

This patent is subject to a terminal disclaimer.

(21) Appl. No.: 13/474,697

(22) Filed: May 17, 2012

(65) Prior Publication Data

US 2013/0003977 A1 Jan. 3, 2013

Related U.S. Application Data

(62) Division of application No. 11/381,486, filed on May 3, 2006, now Pat. No. 8,224,751.

(51) Int. Cl.
*G06F 21/00* (2013.01)
*G06F 21/10* (2013.01)
(Continued)

(52) U.S. Cl.
CPC .............. *G06F 21/10* (2013.01); *H04L 9/083* (2013.01); *H04L 9/14* (2013.01);
(Continued)

(58) Field of Classification Search
None
See application file for complete search history.

(56) References Cited

U.S. PATENT DOCUMENTS

| 5,103,476 A | 4/1992 | Waite et al. |
| 5,638,443 A | 6/1997 | Stefik et al. |

(Continued)

FOREIGN PATENT DOCUMENTS

| AU | 2006302090 | 4/2007 |
| AU | 2010201178 | 4/2010 |

(Continued)

OTHER PUBLICATIONS

Updated portions of prosecution history of AU2012227266, Sep. 13, 2013 (mailing date), Apple Inc.

(Continued)

*Primary Examiner* — Steven S Kim
*Assistant Examiner* — Jason B Fenstermacher
(74) *Attorney, Agent, or Firm* — Morgan, Lewis & Bockius LLP

(57) ABSTRACT

Some embodiments provide an account-based DRM system for distributing content. The system includes several devices that are associated with an account and a set of DRM computers that receives a request to access a piece of content on the devices associated with the account. The DRM computer set then generates a several keys for the devices, where each particular key of each particular device allows the particular device to access the piece of content on the particular device. In some embodiments, the DRM computer set sends the content and keys to one device (e.g., a computer), which is used to distribute the content and the key(s) to the other devices associated with the account. In some embodiments, the DRM computer set individually encrypts each key in a format that is used during its transport to its associated device and during its use on this device.

23 Claims, 7 Drawing Sheets

(51) Int. Cl.
*H04L 9/08* (2006.01)
*H04L 9/14* (2006.01)

(52) U.S. Cl.
CPC ............ *G06F 2221/0706* (2013.01); *G06F 2221/0753* (2013.01); *H04L 2209/603* (2013.01); *Y10S 705/901* (2013.01)

(56) References Cited

U.S. PATENT DOCUMENTS

| | | | |
|---|---|---|---|
| 5,892,900 | A | 4/1999 | Ginter et al. |
| 5,933,497 | A | 8/1999 | Beetcher et al. |
| 5,982,891 | A | 11/1999 | Ginter et al. |
| 6,076,077 | A | 6/2000 | Saito |
| 6,108,703 | A | 8/2000 | Leighton et al. |
| 6,385,596 | B1 | 5/2002 | Wiser et al. |
| 6,427,140 | B1 | 7/2002 | Ginter et al. |
| 6,507,727 | B1 | 1/2003 | Henrick et al. |
| 6,772,340 | B1 | 8/2004 | Peinado et al. |
| 6,865,555 | B2 | 3/2005 | Novak |
| 6,886,098 | B1 * | 4/2005 | Benaloh ............... G06F 21/10 380/239 |
| 6,910,022 | B2 | 6/2005 | Stefik et al. |
| 6,948,070 | B1 | 9/2005 | Ginter et al. |
| 6,986,043 | B2 | 1/2006 | Andrew et al. |
| 6,986,046 | B1 | 1/2006 | Tuvell et al. |
| 6,993,137 | B2 | 1/2006 | Fransdonk |
| 7,007,170 | B2 | 2/2006 | Morten |
| 7,016,498 | B2 | 3/2006 | Peinado et al. |
| 7,017,188 | B1 | 3/2006 | Schmeidler et al. |
| 7,058,809 | B2 | 6/2006 | White et al. |
| 7,073,073 | B1 | 7/2006 | Nonaka et al. |
| 7,080,037 | B2 | 7/2006 | Burger et al. |
| 7,110,984 | B1 | 9/2006 | Spagna et al. |
| 7,124,302 | B2 | 10/2006 | Ginter et al. |
| 7,133,845 | B1 | 11/2006 | Ginter et al. |
| 7,170,999 | B1 | 1/2007 | Kessler et al. |
| 7,203,966 | B2 | 4/2007 | Abburi et al. |
| 7,213,005 | B2 | 5/2007 | Mourad et al. |
| 7,237,268 | B2 | 6/2007 | Fields |
| 7,254,837 | B2 | 8/2007 | Fields |
| 7,340,055 | B2 | 3/2008 | Hori et al. |
| 7,350,238 | B2 | 3/2008 | Abe et al. |
| 7,353,209 | B1 | 4/2008 | Peinado et al. |
| 7,389,273 | B2 | 6/2008 | Irwin et al. |
| 7,395,438 | B2 | 7/2008 | Parks et al. |
| 7,426,637 | B2 | 9/2008 | Risan et al. |
| 7,490,067 | B1 | 2/2009 | Huber et al. |
| 7,567,671 | B2 | 7/2009 | Gupte |
| 7,567,674 | B2 | 7/2009 | Nishimoto et al. |
| 7,570,761 | B2 | 8/2009 | Risan et al. |
| 7,570,762 | B2 | 8/2009 | Kurihara et al. |
| 7,747,876 | B2 | 6/2010 | Oxford |
| 7,757,077 | B2 | 7/2010 | Peinado et al. |
| RE41,657 | E | 9/2010 | Saito |
| 7,802,095 | B2 | 9/2010 | Risan et al. |
| 7,814,022 | B2 | 10/2010 | Gupte |
| 7,860,802 | B2 | 12/2010 | Pandya et al. |
| 7,870,385 | B2 | 1/2011 | Risan et al. |
| 7,940,935 | B2 | 5/2011 | Nakahara et al. |
| 8,005,757 | B2 | 8/2011 | Peinado et al. |
| 8,041,034 | B2 | 10/2011 | Kim et al. |
| 8,099,369 | B2 | 1/2012 | Fahrny et al. |
| 8,180,708 | B2 | 5/2012 | Hurtado et al. |
| 8,224,751 | B2 * | 7/2012 | Farrugia ............... G06F 21/10 705/51 |
| 8,306,918 | B2 | 11/2012 | Farrugia et al. |
| 8,347,098 | B2 | 1/2013 | Farrugia et al. |
| 2001/0042043 | A1 | 11/2001 | Shear et al. |
| 2001/0053979 | A1 | 12/2001 | Kori |
| 2001/0054027 | A1 | 12/2001 | Hasegawa |
| 2002/0002674 | A1 | 1/2002 | Grimes et al. |
| 2002/0006204 | A1 | 1/2002 | England et al. |
| 2002/0007454 | A1 | 1/2002 | Tarpenning et al. |
| 2002/0019814 | A1 | 2/2002 | Ganesan |
| 2002/0064280 | A1 | 5/2002 | Gassho |
| 2002/0138593 | A1 | 9/2002 | Novak et al. |
| 2003/0018582 | A1 | 1/2003 | Yaacovi |
| 2003/0023564 | A1 | 1/2003 | Padhye et al. |
| 2003/0056212 | A1 | 3/2003 | Siegel et al. |
| 2003/0078853 | A1 | 4/2003 | Peinado et al. |
| 2003/0079038 | A1 | 4/2003 | Robbin et al. |
| 2003/0084306 | A1 | 5/2003 | Abburi et al. |
| 2003/0097379 | A1 | 5/2003 | Ireton |
| 2003/0131353 | A1 | 7/2003 | Blom et al. |
| 2003/0161473 | A1 | 8/2003 | Fransdonk |
| 2003/0194092 | A1 | 10/2003 | Parks et al. |
| 2003/0198349 | A1 | 10/2003 | Aizu et al. |
| 2003/0217011 | A1 | 11/2003 | Peinado et al. |
| 2004/0003267 | A1 | 1/2004 | Strom et al. |
| 2004/0024688 | A1 | 2/2004 | Bi et al. |
| 2004/0032950 | A1 | 2/2004 | Graunke |
| 2004/0039932 | A1 | 2/2004 | Elazar et al. |
| 2004/0044779 | A1 | 3/2004 | Lambert |
| 2004/0049694 | A1 | 3/2004 | Candelore |
| 2004/0064416 | A1 | 4/2004 | Peled et al. |
| 2004/0103300 | A1 | 5/2004 | Risan et al. |
| 2004/0107356 | A1 | 6/2004 | Shamoon et al. |
| 2004/0111613 | A1 | 6/2004 | Shen-Orr et al. |
| 2004/0111631 | A1 | 6/2004 | Kocher et al. |
| 2004/0143760 | A1 | 7/2004 | Alkove et al. |
| 2004/0148523 | A1 | 7/2004 | Lambert |
| 2004/0158712 | A1 | 8/2004 | Lee et al. |
| 2004/0172533 | A1 | 9/2004 | DeMello et al. |
| 2004/0181490 | A1 | 9/2004 | Gordon et al. |
| 2004/0181667 | A1 | 9/2004 | Venters, III et al. |
| 2004/0187014 | A1 | 9/2004 | Molaro |
| 2004/0242224 | A1 | 12/2004 | Janik et al. |
| 2004/0242269 | A1 | 12/2004 | Fadell |
| 2004/0249768 | A1 | 12/2004 | Kontio et al. |
| 2005/0004875 | A1 | 1/2005 | Kontio et al. |
| 2005/0027991 | A1 | 2/2005 | DiFonzo |
| 2005/0050345 | A1 | 3/2005 | Dowdy et al. |
| 2005/0071278 | A1 * | 3/2005 | Simelius ............................ 705/52 |
| 2005/0071744 | A1 | 3/2005 | Dunbar et al. |
| 2005/0086326 | A1 | 4/2005 | Manning et al. |
| 2005/0086501 | A1 | 4/2005 | Woo et al. |
| 2005/0091173 | A1 | 4/2005 | Alve |
| 2005/0097063 | A1 * | 5/2005 | Benaloh ............... G06F 21/10 705/71 |
| 2005/0102513 | A1 * | 5/2005 | Alve ............................ 713/168 |
| 2005/0169467 | A1 | 8/2005 | Risan et al. |
| 2005/0182931 | A1 | 8/2005 | Robert et al. |
| 2005/0203853 | A1 | 9/2005 | Yamamoto et al. |
| 2005/0203959 | A1 | 9/2005 | Muller et al. |
| 2005/0210249 | A1 | 9/2005 | Lee et al. |
| 2005/0216763 | A1 | 9/2005 | Lee et al. |
| 2005/0228988 | A1 | 10/2005 | Traw et al. |
| 2005/0268098 | A1 | 12/2005 | Oh et al. |
| 2005/0273629 | A1 | 12/2005 | Abrams et al. |
| 2005/0278259 | A1 | 12/2005 | Gunaseelan et al. |
| 2005/0283791 | A1 | 12/2005 | McCarthy et al. |
| 2005/0289076 | A1 | 12/2005 | Lambert |
| 2006/0005257 | A1 | 1/2006 | Tohru et al. |
| 2006/0010500 | A1 | 1/2006 | Elazar et al. |
| 2006/0015944 | A1 | 1/2006 | Fields |
| 2006/0015945 | A1 | 1/2006 | Fields |
| 2006/0020784 | A1 | 1/2006 | Jonker et al. |
| 2006/0021068 | A1 | 1/2006 | Xu et al. |
| 2006/0053079 | A1 | 3/2006 | Edmonson et al. |
| 2006/0064759 | A1 * | 3/2006 | Agranat ............... G06F 21/10 726/26 |
| 2006/0069645 | A1 * | 3/2006 | Chen ............... H04L 63/0464 705/51 |
| 2006/0107285 | A1 | 5/2006 | Medvinsky |
| 2006/0143481 | A1 * | 6/2006 | Morten ............... G06F 21/10 713/193 |
| 2006/0159303 | A1 | 7/2006 | Davis et al. |
| 2006/0236097 | A1 | 10/2006 | Prologo et al. |
| 2006/0282864 | A1 | 12/2006 | Gupte |
| 2007/0198419 | A1 | 8/2007 | Park et al. |
| 2007/0208668 | A1 * | 9/2007 | Candelore ............ G06Q 20/3829 705/57 |
| 2007/0219917 | A1 | 9/2007 | Liu et al. |

(56) References Cited

U.S. PATENT DOCUMENTS

| | | |
|---|---|---|
| 2007/0276760 A1 | 11/2007 | Kanehara et al. |
| 2008/0256368 A1 | 10/2008 | Ross et al. |
| 2009/0063871 A1 | 3/2009 | Frijters et al. |
| 2013/0066785 A1 | 3/2013 | Farrugia et al. |
| 2013/0067244 A1 | 3/2013 | Farrugia et al. |
| 2013/0073466 A1 | 3/2013 | Farrugia et al. |
| 2014/0075180 A1 | 3/2014 | Farrugia et al. |

FOREIGN PATENT DOCUMENTS

| | | |
|---|---|---|
| AU | 2012227266 | 10/2012 |
| CA | 2476919 | 2/2006 |
| CA | 2625360 | 4/2007 |
| CA | 2715439 | 4/2007 |
| CN | 1604080 | 4/2005 |
| EP | 0614308 | 9/1994 |
| EP | 0715246 | 6/1996 |
| EP | 1085443 | 3/2001 |
| EP | 1189432 | 3/2002 |
| EP | 1465426 | 10/2004 |
| EP | 1521260 | 4/2005 |
| EP | 1777639 | 4/2007 |
| EP | 1777706 | 4/2007 |
| EP | EP 1852799 | 11/2007 |
| EP | 2065828 | 6/2009 |
| EP | 2315151 | 4/2011 |
| EP | 2466511 | 6/2012 |
| EP | 2485174 | 8/2012 |
| EP | 2528007 | 11/2012 |
| EP | 2528008 | 11/2012 |
| JP | 2001-160003 | 6/2001 |
| JP | 2001-256196 | 9/2001 |
| JP | 2002-007733 | 1/2002 |
| JP | 2003-058660 | 2/2003 |
| JP | 2005-110215 | 4/2005 |
| JP | 2005-228347 | 8/2005 |
| KR | 10-2005-0046750 | 5/2005 |
| WO | WO 1996/024209 | 8/1996 |
| WO | WO 2000/031964 | 6/2000 |
| WO | WO 2000/076236 | 12/2000 |
| WO | WO 2002/003176 | 1/2002 |
| WO | WO 03/036541 | 5/2003 |
| WO | WO 2003/088065 | 10/2003 |
| WO | WO 2004/008460 | 1/2004 |
| WO | WO 2004/070588 | 8/2004 |
| WO | WO 2004/097609 | 11/2004 |
| WO | WO 2005/106681 | 11/2005 |
| WO | WO 2005/116859 | 12/2005 |
| WO | WO 2006/101549 | 9/2006 |
| WO | WO 2007/044825 | 4/2007 |
| WO | WO 2008/048712 | 4/2008 |
| WO | WO 2008/147617 | 12/2008 |

OTHER PUBLICATIONS

Updated portions of prosecution history of CA2625360, Sep. 24, 2013 (mailing date), Apple Inc.
Updated Portions of prosecution history of CA2715439, Aug. 15, 2013 (mailing date), Apple Inc.
Updated portions of prosecution history of EP12175992, Jul. 15, 2013 (mailing date), Apple Inc.
Portions of prosecution history of EP12175994, Jul. 29, 2013 (mailing date), Apple Inc.
Updated portions of prosecution history of EP10196353, Oct. 3, 2013 (mailing date), Apple Inc.
Updated portions of prosecution history of AU2012227266, Oct. 15, 2013 (issuance date), Apple Inc.
U.S. Appl. No. 13/612,747, filed Sep. 12, 2012, Farrugia, Augustin J., et al.
U.S. Appl. No. 13/612,766, filed Sep. 12, 2012, Farrugia, Augustin J., et al.
U.S. Appl. No. 13/612,780, filed Sep. 12, 2012, Farrugia, Augustin J., et al.
U.S. Appl. No. 13/615,492, filed Sep. 13, 2012, Farrugia, Augustin J., et al.
Portions of prosecution history of EP07107470, Nov. 14, 2011 (mailing date), Apple Inc.
International Search Report and Written Opinion for PCT/US2007/068081, dated May 7, 2008, Apple Inc.
International Preliminary Report on Patentability for PCT/U82007/068081, dated Nov. 4, 2008, Apple.
Portions of prosecution history of AU2006302090, Jul. 16, 2012 (mailing date), Apple Inc.
Portions of prosecution history of AU2010201178, Jul. 16, 2012 (mailing date), Apple Inc.
Portions of prosecution history of CA20062625360, Sep. 10, 2010 (mailing date), Apple Inc.
Portions of prosecution history of CA20062715439, Dec. 28, 2012 (mailing date), Apple Inc.
Portions of prosecution history of EP06291581, Jul. 23, 2012 (mailing date), Apple Inc.
Portions of prosecution history of EP10196353, Jun. 27, 2012 (mailing date), Apple Inc.
International Search Report and Written Opinion for PCT/US2006/039778, dated Jan. 22, 2008, Apple Inc.
International Preliminary Report on Patentability for PCT/US2006/039778, dated Mar. 17, 2009, Apple Inc.
Portions of prosecution history of EP08251614, Feb. 9, 2012 (mailing date), Apple Inc.
Portions of prosecution history of EP12157933, Jan. 31, 2013 (mailing date), Apple Inc.
Portions of prosecution history of EP12157936, Dec. 5, 2012 (mailing date), Apple Inc.
International Search Report and Written Opinion for PCT/US2008/061817, dated Sep. 1, 2008, Apple Inc.
International Preliminary Report on Patentability for PCT/US2008/061817, dated Nov. 24, 2009, Apple Inc.
Gong, Li, et al., "Going Beyond the Sandbox: An Overview of the New Security Architecture in the Java <TM> Development Kit 1.2," Proceedings of the Usenix Symposium on Internet Technologies and Systems, Dec. 8-11, 1997, pp. 103-112.
Mori, Ryoichi, et al., "Superdistribution: The Concept and the Architecture," Transactions of the Institute of Electronics, Information and Communication Engineers, Jul. 1990, pp. 1133-1146., vol. E73, No. 7, Tokyo, JP.
Rosenblatt, Bill, "Rights Information Management," http://www.giantstepsmts.com, Sep. 21, 2006, pp. 1-12, GiantSteps Media Technology Strategies, New York, New York, USA.
Updated portions of prosecution history of EP07107470, Jul. 15, 2014 (mailing date), Apple Inc.
Portions of prosecution history of AU2012227266, Mar. 23, 2013 (mailing date), Apple Inc.
Updated portions of prosecution history of CA20062625360, Mar. 27, 2013 (mailing date), Apple Inc.
Portions of prosecution history of EP12175992, Jun. 12, 2013 (mailing date), Apple Inc.
Updated portions of prosecution history of CA2625360, Oct. 28, 2013 (mailing date), Apple Inc.
Updated portions of prosecution history of EP12157933.8, Dec. 3, 2013 (mailing date), Apple Inc.
Updated portions of prosecution history of EP12157936.1, Dec. 3, 2013 (mailing date), Apple Inc.

* cited by examiner

DEVICE-INDEPENDENT MANAGEMENT OF CRYPTOGRAPHIC INFORMATION

CLAIM OF BENEFIT TO PRIOR APPLICATIONS

This Application is a divisional application of U.S. patent application Ser. No. 11/381,486, filed May 3, 2006, published as U.S. Publication 2007/0260548, now issued as U.S. Pat. No. 8,224,751. U.S. Publication 2007/0260548, now issued as U.S. Pat. No. 8,224,751, is incorporated herein by reference.

FIELD OF THE INVENTION

The invention relates to device-independent management of cryptographic information.

BACKGROUND OF THE INVENTION

The protection of digital content transferred between computers over a network is fundamentally important for many enterprises today. Enterprises attempt to secure this protection by implementing some form of Digital Rights Management (DRM) process. The DRM process often involves encrypting the piece of content (e.g., encrypting the binary form of the content) to restrict usage to those who have been granted a right to the content.

Cryptography is the traditional method of protecting data in transit across a network. In its typical application, cryptography protects communications between two mutually trusting parties from thievery by attack on the data in transit. However, for many digital file transfer applications today (e.g., for the transfer of audio or video content), the paradigm has shifted, as a party that receives the content (i.e. the "receiving party") might try to break the DRM encryption that the party that supplied the content (i.e., the "distributing party") applied to the content. In addition, with the proliferation of network penetration attacks, a third party may obtain access to the receiving party's computer and thus to the protected content.

In many of the DRM systems today, the weakest link in the security is not the encrypted data but rather the cryptographic key management and handling. For instance, one of the more successful DRM systems, which distribute music online, requires the receiving party's computer to maintain the unencrypted key for each piece of encrypted music in a "Keybag" that is encrypted.

This approach has two disadvantages. First, by encrypting the Keybag instead of the keys contained in the Keybag, this approach exposes the keys to a potential attack at different instances in time. For instance, each time the receiving party's computer has to store a new key for a piece of content, the computer has to decrypt the entire Keybag, add the new key to the Keybag, and then re-encrypt the Keybag. Similarly, to play a piece of content, the receiving party's computer has to decrypt the entire Keybag, retrieve the key for the piece of content, and decrypt the content with the retrieved key. In either of these situations, all the keys are exposed to a potential attacker when the Keybag is decrypted.

Second, this prior DRM approach allows different devices to use different formats for their Keybags. For instance, it allows a receiving party's computer to use a different Keybag format than a music player to which the computer downloads its music. The use of different Keybag formats for different devices further exposes the keys for decrypting the content that is transferred between the devices. For instance, when the receiving party synchronizes the music player's music library with that of the computer, the computer has to decrypt its Keybag and transfer the synchronized content and its associated keys to the music player. The music player then stores the received content in a storage device, and stores the received keys in the player's particular format in the player's Keybag. During this transfer, all the keys are exposed to a potential attacker.

Therefore, there is a need in the art for a DRM system that minimizes the exposure of cryptographic keys at various stages of the DRM process. Such a system should minimize exposure during the local storage of the cryptographic keys on the devices that will use such keys to decrypt and access content. This system should also minimize exposure of the cryptographic key while the encrypted content is being access by a receiving device. This system should further minimize exposure of the cryptographic keys while the receiving party is transferring content between two devices.

SUMMARY OF THE INVENTION

Some embodiments provide an account-based DRM system for distributing content. The system includes several devices that are associated with one particular account. The system also includes a set of DRM computers that receives a request to access a particular piece of content on the devices associated with the particular account. The DRM computer set then generates a several keys for the devices, where each particular key of each particular device allows the particular device to access the particular piece of content on the particular device.

Through a network, the DRM computer set of some embodiments sends the particular piece of content and the generated keys to the devices associated with the particular account. The network is a local area network, a wide area network, or a network of networks, such as the Internet. In some of these embodiments, the DRM computer set sends the content and keys to one device (e.g., a computer), which is used to distribute the content and the key(s) to the other devices associated with the account. In some embodiments, the DRM computer set individually encrypts each key in a format that is used during its transport to its associated device and during its use on this device.

Some embodiments provide a digital rights management (DRM) method for distributing a piece of content to a user. The user has at least two devices for accessing the content. The method sends to the user the piece of content in a protected format. From a set of DRM computers, the method also sends to the user (1) a first key that enables the user to access the protected content on the first device, and (2) a second key that enables the user to access the protected content on the second device.

In some embodiments, the first and second keys are for decrypting the piece of content. In other embodiments, the first and second keys are for decrypting another key or other keys that are used to encrypt the piece of content. The method in some embodiments individually encrypts the first and second keys before sending them to the first and second devices.

Also, in some embodiments, the first device is a user computer and the second device is another device (e.g., portable media player) that synchronizes its content with the user computer. In some of these embodiments, the user computer (1) receives the piece of content and the first and second keys, and (2) provides the received content as well as the second key to the second device subsequently when the second device synchronizes its content with the user computer. In some embodiments, the user computer provides to the second device the content and the second key in the same protected format that it received the content and the second key.

Before sending the content and the keys to the user, the method in some embodiments (1) receives a request from the user to obtain the piece of content, and (2) generates the first and second keys at the set of DRM computers. In some embodiments, the user has more than two devices for accessing the content. In some such embodiments, the method generates at the DRM computer set more than two keys for the user after receiving the user's request for the content. In such a case, each particular generated key is to enable the user to access the content on a particular device associated with the user.

Also, in some of these embodiments, the method individually encrypts each generated key in a format that is used during its transport to its associated device, and during its storage and use on this device. The transport, storage, or usage of any key in these embodiments does not require the decryption of another key that the DRM computer set generates for other devices or contents.

In some embodiments, the first device stores its encrypted keys for decrypting DRM content in a first Keybag, while the second device stores the encrypted keys for decrypting DRM content in a second Keybag. The first and second Keybags have the same format in some embodiments. Using Keybags with the same format minimizes exposure of keys during the transfer of content and keys between the first and second devices, when one of these devices synchronizes its content and keys with the other device. The exposure is minimized because it eliminates operations that are due to transforming data between two different Keybag formats. In some embodiments, the first and second devices encrypt their respective Keybags, while in other embodiments they do not encrypt their respective Keybags but only store individually encrypted keys in those Keybags.

The DRM computer set of some embodiments also sends other DRM material along with the cryptographic keys. Such other DRM data include in some embodiments data relating to the DRM system, such as the DRM type, rules, etc. The other DRM material also includes in some embodiments data relating to the cryptographic key (e.g., the nature of the key, etc.). Other embodiments might include other types of DRM material.

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

Figure 1:
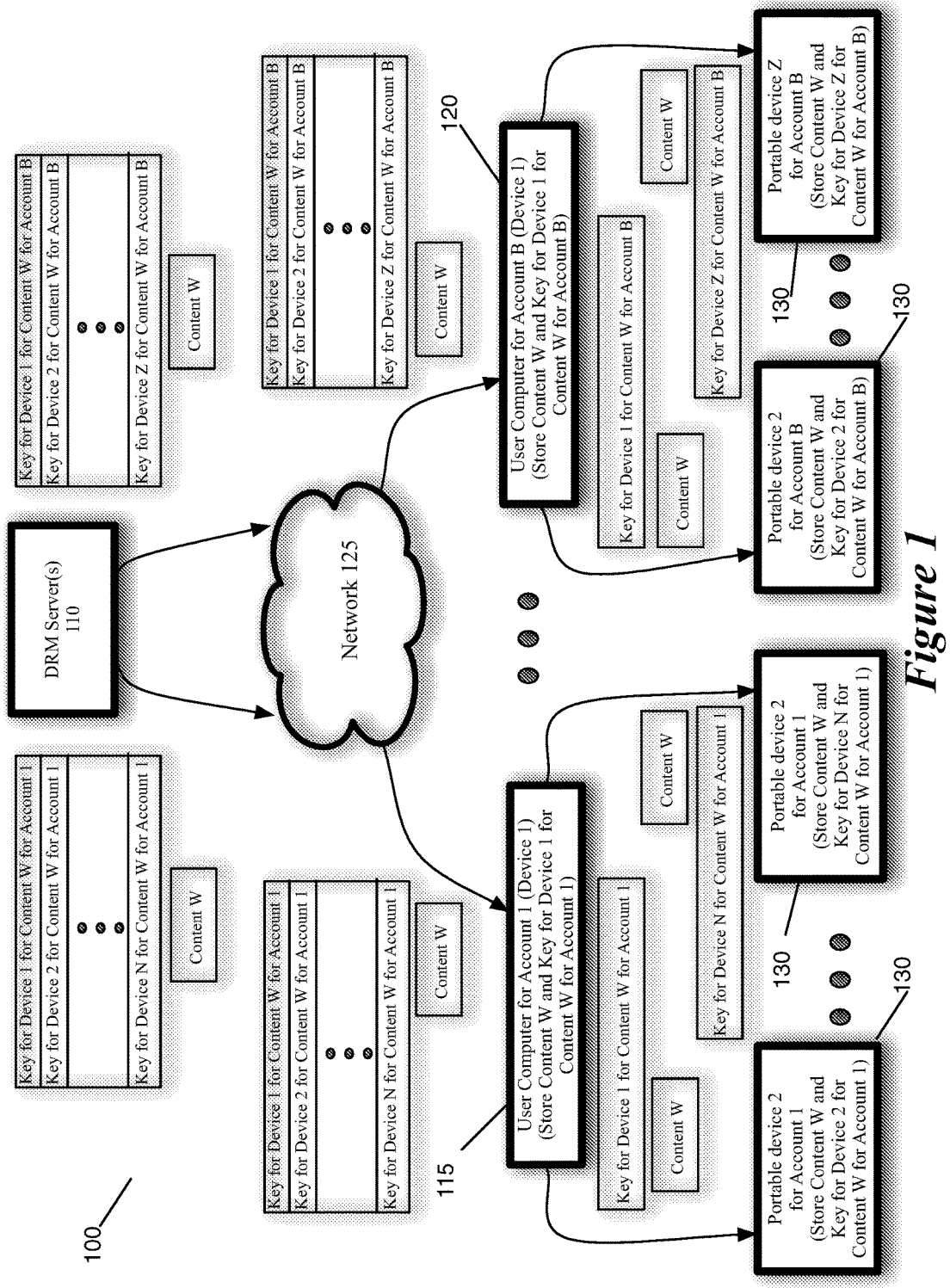
FIG. 1 illustrates an account-based DRM system of some embodiments.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Overview

Some embodiments provide a digital rights management (DRM) method for distributing a piece of content to a user. The user has at least two devices for accessing the content. The method sends to the user the piece of content in a protected format. From a set of DRM computers, the method also sends to the user (1) a first key that enables the user to access the protected content on the first device, and (2) a second key that enables the user to access the protected content on the second device.

In some embodiments, the first and second keys are for decrypting the piece of content. In other embodiments, the first and second keys are for decrypting another key or other keys that are used to encrypt the piece of content. The method in some embodiments individually encrypts the first and second keys before sending them to the first and second devices.

Also, in some embodiments, the first device is a user computer and the second device is another device (e.g., portable media player) that synchronizes its content with the user computer. In some of these embodiments, the user computer (1) receives the piece of content and the first and second keys, and (2) provides the received content as well as the second key to the second device subsequently when the second device synchronizes its content with the user computer. In some embodiments, the user computer provides to the second device the content and the second key in the same protected format that it received the content and the second key.

Before sending the content and the keys to the user, the method in some embodiments (1) receives a request from the user to obtain the piece of content, and (2) generates the first and second keys at the set of DRM computers. In some embodiments, the user has more than two devices for accessing the content. In some such embodiments, the method generates at the DRM computer set more than two keys for the user after receiving the user's request for the content. In such a case, each particular generated key is to enable the user to access the content on a particular device associated with the user.

Also, in some of these embodiments, the method individually encrypts each generated key in a format that is used during its transport to its associated device, and during its storage and use on this device. The transport, storage, or usage of any key in these embodiments does not require the decryption of another key that the DRM computer set generates for other devices or contents.

In some embodiments, the first device stores its encrypted keys for decrypting DRM content in a first Keybag, while the second device stores the encrypted keys for decrypting DRM content in a second Keybag. The first and second Keybags have the same format in some embodiments. Using Keybags with the same format minimizes exposure of keys during the transfer of content and keys between the first and second devices, when one of these devices synchronizes its content and keys with the other device. The exposure is minimized because it eliminates operations that are due to transforming data between two different Keybag formats. In some embodiments, the first and second devices encrypt their respective Keybags, while in other embodiments they do not encrypt their respective Keybags but only store individually encrypted keys in those Keybags.

The DRM computer set of some embodiments sends other DRM material along with the cryptographic keys. Such other DRM data include in some embodiments data relating to the DRM system, such as the DRM type, rules, etc. The other DRM material also includes in some embodiments data relating to the cryptographic key (e.g., the nature of the key, etc.). Other embodiments might include other types of DRM material.

II. Account-Based DRM System

FIG. 1 illustrates an account-based DRM system 100 of some embodiments. This DRM system distributes content in a manner that ensures the legal use of the content. As shown in FIG. 1, the DRM system 100 includes a set of DRM servers 110 that distribute content to several devices associated with B user accounts. This figure illustrates two sets of devices associated with two accounts, account 1 and account B. The set of devices for account 1 includes a user computer 115 and several portable media device 130. In the example illustrated in FIG. 1, the devices for the two different user accounts are mutually exclusive. This might not be the case in some embodiments. Some embodiments might allow one device (e.g., one user computer, etc.) to process DRM content for two different user accounts.

The DRM server set 110 connects to the user computers 115 and 120 through a computer network 125, such as a local area network, a wide area network, a network of networks (e.g., the Internet), etc. Through this connection, the user computers 115 and 120 communicate with the DRM server set 110 to purchase, license, update, or otherwise obtain content in some embodiments. While in some embodiments, the DRM server set 110 sells or licenses content to the user computers, this set in other embodiments does not sell or license the content. For instance, in some of embodiments, the DRM server set 110 simply enforces the distribution of content to authorized computers without having any financial objective.

In some embodiments, the DRM server set 110 includes a content caching server that provides encrypted content to a user computer 115 or 120 through the network 125, after another DRM server 110 determines that the computer 115 or 120 can obtain the content. In some embodiments, the system 100 uses multiple caching servers to cache content at various locations on the network, in order to improve the speed and efficiency of downloading content across the network.

As mentioned above, a user computer 115 or 120 that is associated with a particular account communicates with the DRM server set 110 to purchase, license, update, or otherwise obtain content through the network 125 for the particular account. In some embodiments, the DRM server set 110 (1) supplies each requested piece of content in an encrypted format, and (2) for each device associated with the requesting account, supplies a cryptographic key for decrypting the encrypted content.

FIG. 1 illustrates an example of the DRM server set 110 distributing one piece of encrypted content (content W) to the devices associated with the two different user accounts 1 and B. As shown in this figure, the DRM server set distributes the encrypted content W to both user computers 115 and 120, along with a set of cryptographic keys for accessing this content on each device associated with the user accounts 1 and B.

The DRM server set distributes the content W and each set of cryptographic keys in an encrypted format. Also, in some embodiments, each cryptographic key in the set is encrypted individually. The DRM server set 110 of some embodiments provides the cryptographic key set in a transport Keybag. A Keybag is a data storage structure that stores the cryptographic keys according to a particular format. The transport Keybag is encrypted in its entirety for the transport in some embodiments, while it is not encrypted for the transport in other embodiments.

Figure 2:
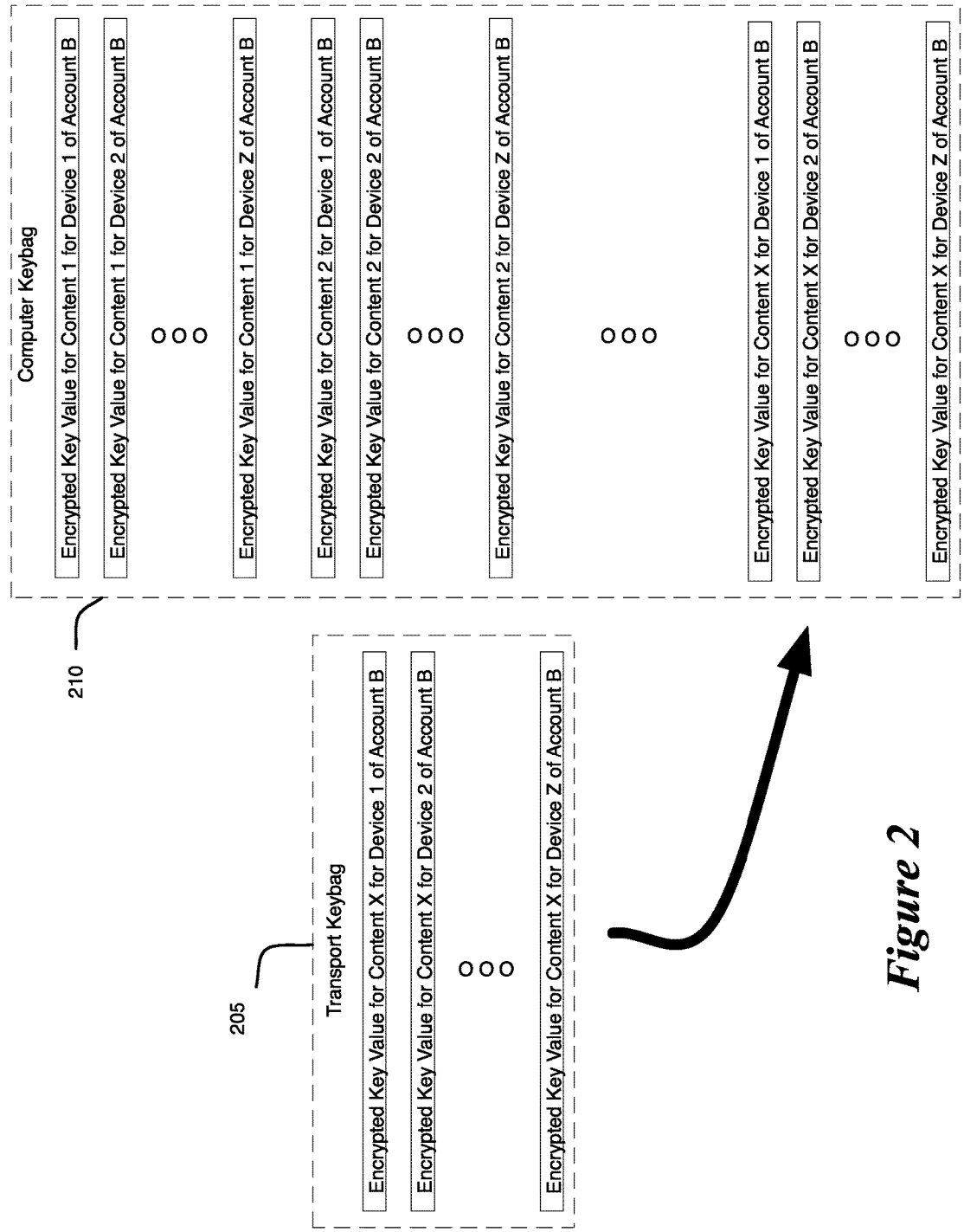
FIG. 2 illustrates an example of a transport Keybag for a user computer.

FIG. 2 illustrates an example of such a transport Keybag 205 for the user computer 120. As shown in this figure, the user computer 120 extracts each individually encrypted key from the transport Keybag 205 and stores these keys in a Keybag 210 that it maintains. The keys in the Keybag 210 are the same as the keys in the Keybag 205 (i.e., they are individually encrypted in the same format as they appear in Keybag 205). Also, the Keybags 205 and 210 and 210 are encrypted in their entirety in some embodiments, while they are not encrypted in other embodiments.

FIG. 1 illustrates that each user computer 115 or 120 stores the received encrypted content W and the cryptographic key that it receives for accessing this content. Each user computer 115 or 120 also provides each portable media device 130 that synchronizes with it the received encrypted content W and the cryptographic key that the user computer received for the portable media device.

For instance, as shown in FIG. 1, the user computer 115 provides to device 2 for account 1 the received encrypted content W plus the cryptographic key for accessing the encrypted content W on device 2. The user computer 120, on the other hand, provides to device Z for account B the received encrypted content W plus the cryptographic key for accessing the encrypted content W on device Z.

In some embodiments, each user computer deletes a cryptographic key that it provides to another device after the synchronization operation, while in other embodiments, each user computer continues to store the cryptographic keys that it provides to devices that synchronize their content with the computer.

Figure 3:
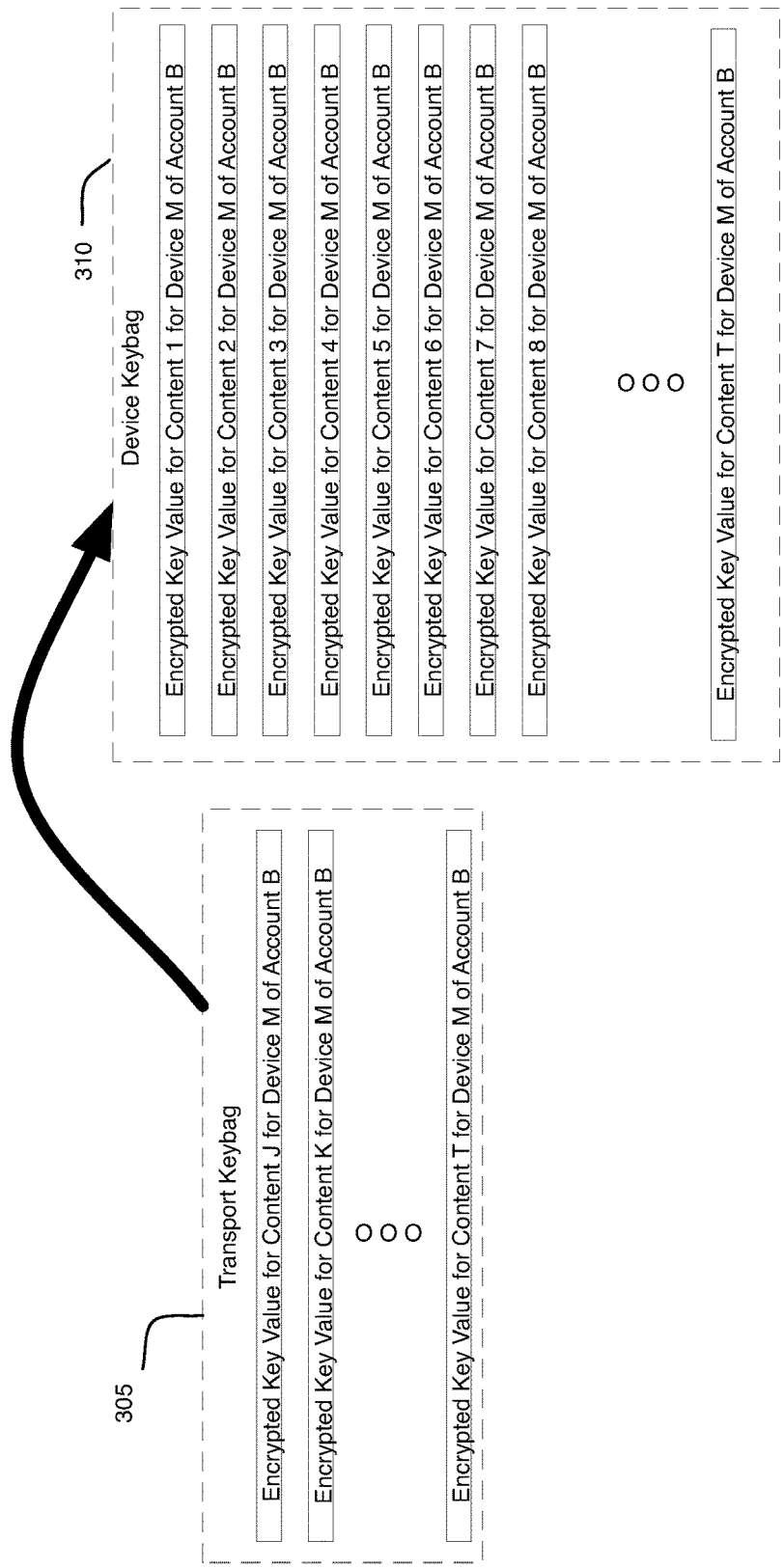
FIG. 3 illustrates a transport Keybag that includes all the cryptographic keys that a device M might receive from the user computer during a synchronization operation.

In some embodiments, each synchronizing device stores in a Keybag the cryptographic keys that it receives from its associated user computer. FIG. 3 illustrates an example of this for one of the device (device M) associated with the account B. Specifically, this figure illustrates a transport Keybag 305 that includes all the cryptographic keys that a device M might receive from the user computer 120 during a synchronization operation. As shown in this figure, the device M extracts each individually encrypted key from the transport Keybag 305 and stores these keys in a Keybag 310 it maintains. The keys in the Keybag 310 are the same as the keys in the Keybag 305 (i.e., they are individually encrypted in the same format as they appear in Keybag 305). Also, the Keybags 305 and 310 and 310 are encrypted in their entirety in some embodiments, while they are not encrypted in other embodiments.

In some embodiments, the Keybags 205, 210, 305, and 310 all have the same format. Using Keybags with the same format minimizes exposure of keys during the transfer of the cryptographic keys between the DRM server set, user computers, and the other devices associated with the accounts. The exposure is minimized because using the same format eliminates operations that are due to transforming data between two different Keybag formats. Also, individually encrypting each key has the advantage that a device can decrypt and use any encrypted key for a particular piece of content, without decrypting another encrypting key, which the device does not need for the particular piece of content.

Figure 4:
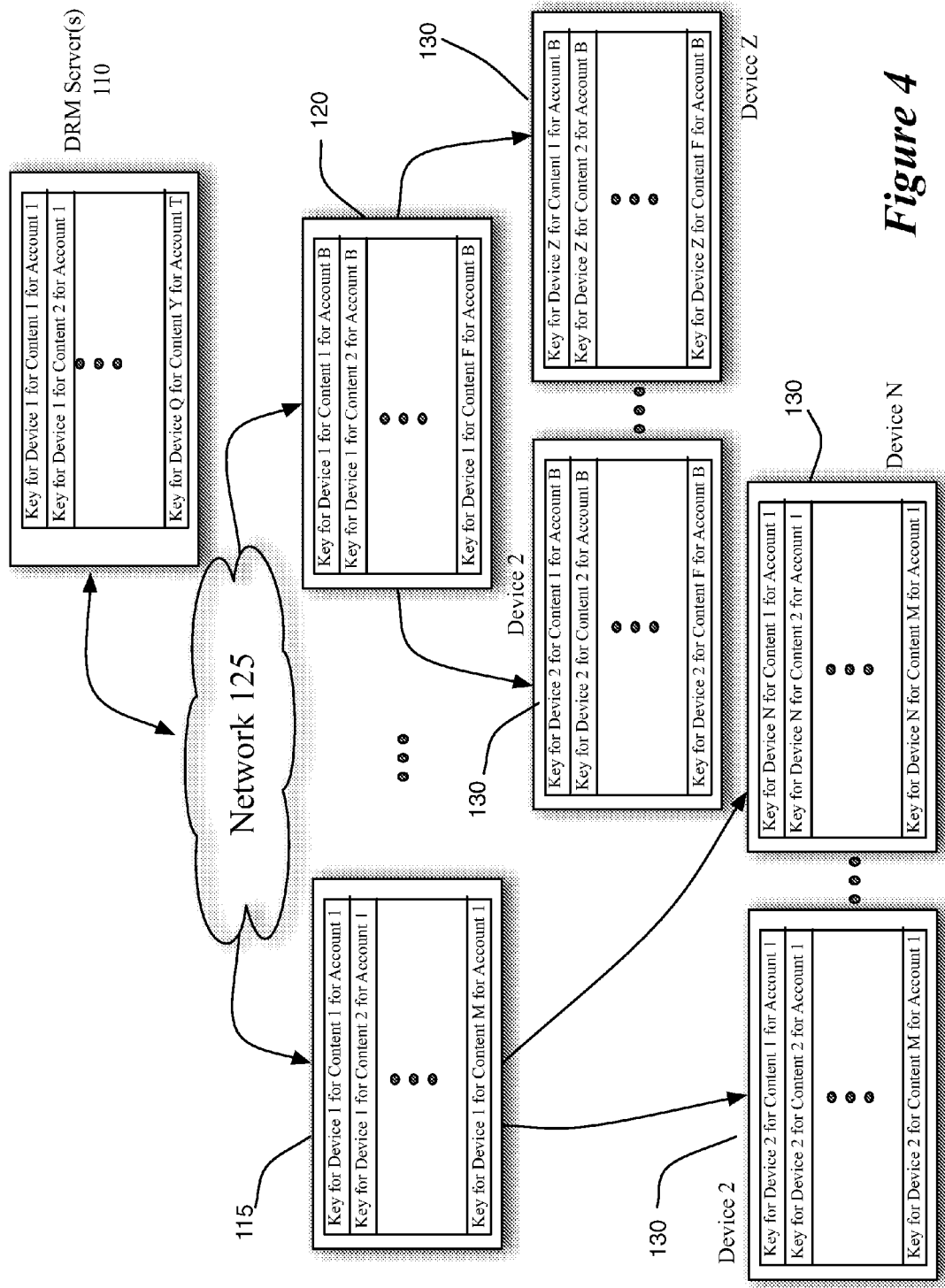
FIG. 4 illustrates that in some embodiments the cryptographic key that is used to access a particular piece of content on a particular device (1) is generated and stored on the DRM server set, and (2) is stored on the particular device.

FIG. 4 illustrates that in some embodiments the cryptographic key that is used to access a particular piece of content on a particular device (1) is generated and stored on the DRM server set, and (2) is stored on the particular device. Specifically, this figure illustrates a DRM architecture where the DRM server set 110 generates and stores the cryptographic keys for each piece of content that this set directly or indirectly distributes to each device associated with each user account. This figure also illustrates that the user computers 115 and 120 that initially receive the DRM content for each account store at least the cryptographic key for accessing each piece of content on the user computers. As mentioned above, each user computer in some embodiments also stores the cryptographic key for accessing the received content on each device that synchronizes with the computer.

FIG. 4 also illustrates that each device stores the cryptographic keys for accessing each piece of content that it is allowed to access. In some embodiments, each cryptographic key generated by the DRM server set for a particular device is for decrypting a piece of content on the particular device. In other embodiments, each such key is for decrypting another key or other keys that the particular device uses to decrypt content.

FIGS. 1 and 4 illustrate user computers 115 and 120 that receive content and cryptographic keys from the DRM server set and synchronize the content and cryptographic keys with other devices associated with accounts 1 and B. One of ordinary skill will realize that some embodiments might have multiple devices (e.g., computers, portable electronic or communication devices, etc.) that directly receive content from the DRM server set 110 through a communication network. Also, one of ordinary skill will realize that the user computer 115 or 120 can be embedded in any type of device, such as a consumer or commercial electronic device, a home media center or hub, etc.

As mentioned above, the DRM server set of some embodiments sends other DRM material along with the cryptographic keys. Such other DRM data include in some embodiments data relating to the DRM system, such as the DRM type, rules, etc. The other DRM material also includes in some embodiments data relating to the cryptographic key (e.g., the nature of the key, etc.). Other embodiments might include other types of DRM material.

III. Key Generation and Distribution Flow

Figure 5:
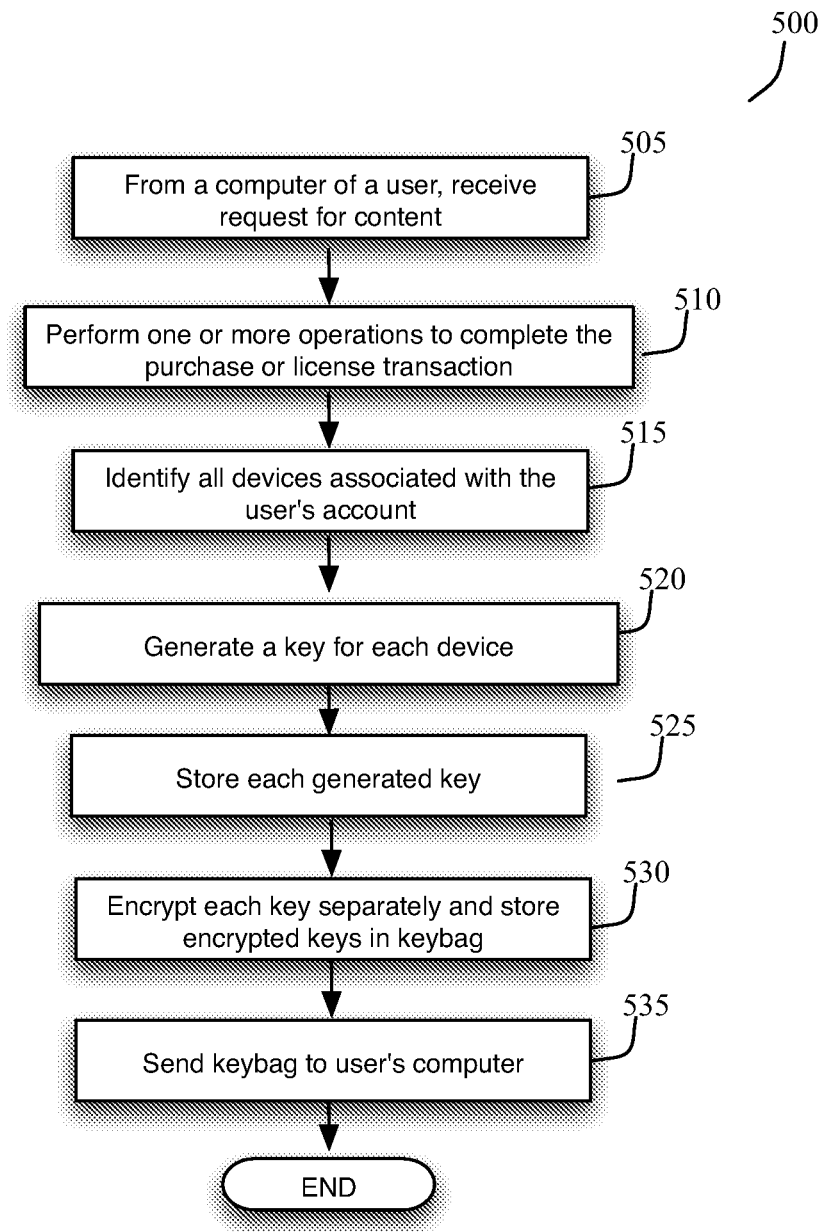
FIG. 5 conceptually illustrates a process that the DRM server set performs to process a request from a user account to purchase or license a particular piece of content.
Figure 6:
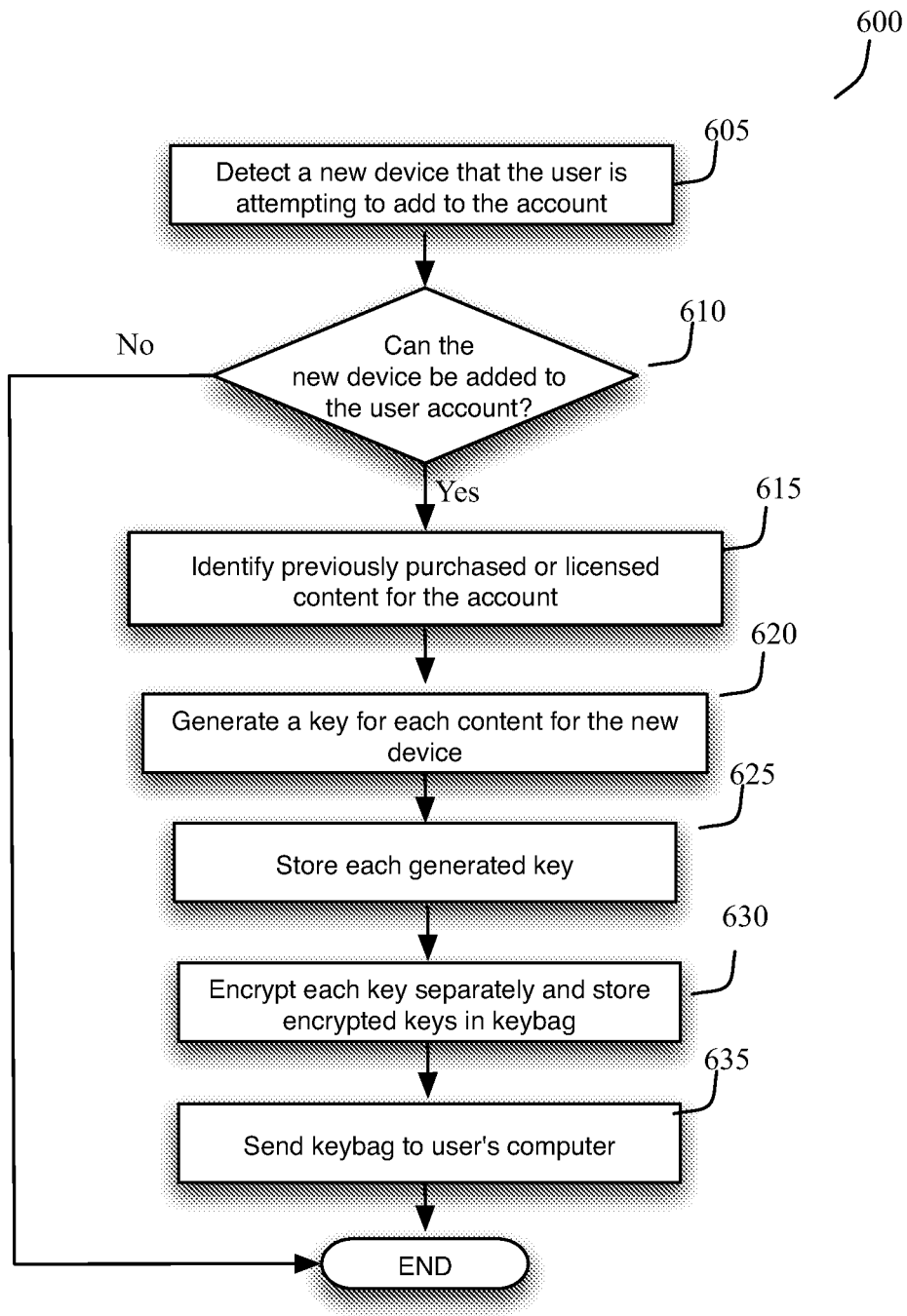
FIG. 6 conceptually illustrates a process that the DRM server set performs in some embodiments when it detects that a new device is being added to a user account.
Figure 7:
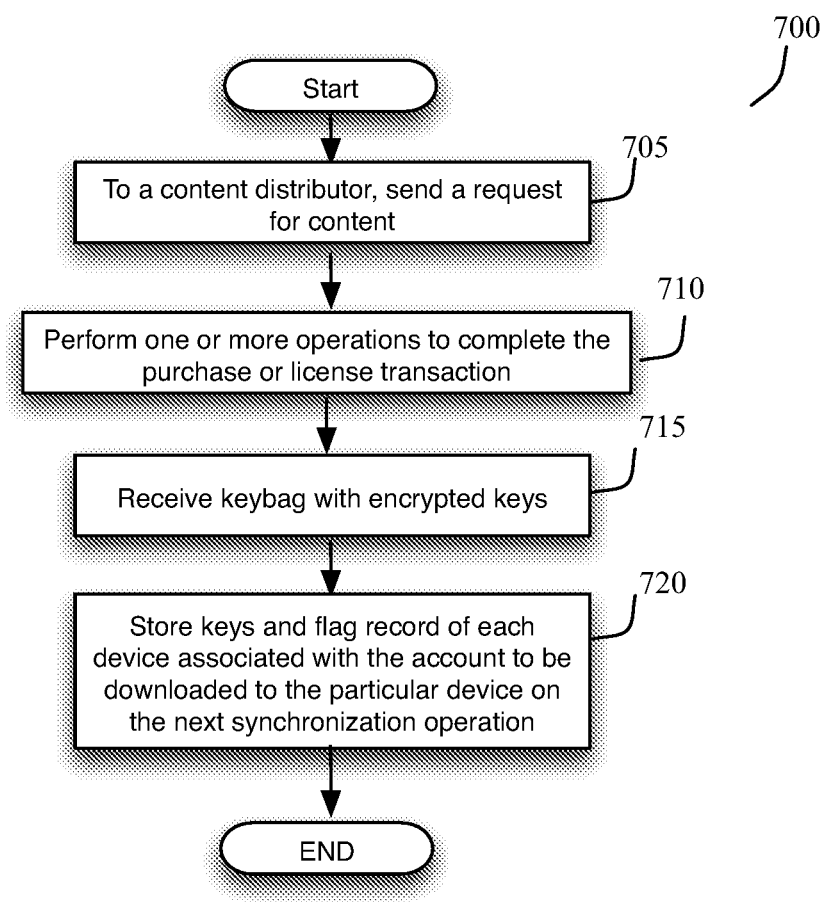
FIG. 7 conceptually illustrates a process that a user computer performs when it needs to purchase or license a particular piece of content for a particular user account.

FIGS. 5-7 conceptually illustrate several processes for generating keys and distributing content and keys in some embodiments. These processes are described in the context of a purchase or a license of a particular piece of content. One of ordinary skill will realize that these processes can be performed without any of the financial objective or transactions in other embodiments.

FIG. 5 conceptually illustrates a process 500 that the DRM server set performs to process a request from a user account to purchase or license a particular piece of content. The content may be any form of content, such as a music file, a video file, a document, an image, etc. As shown in this figure, the process 500 starts when it receives (at 505) a request for the particular content from a user computer that synchronizes all the keys and content for a particular user account.

The process then performs (at 510) a set of one or more operations to complete the purchase or license transaction. Next, the process identifies (at 515) all the devices associated with the particular user account. At 520, the process then generates a cryptographic key for each device associated with the particular user account. The cryptographic key for each particular device is the key that would allow the particular device to access an encrypted version of the particular piece of content.

At 525, the process then stores each cryptographic key that it generated at 520. Next, at 530, the process individually encrypts each key that it generated at 520. At 530, the process also stores the individually encrypted keys in a Keybag. In some embodiments, the process 500 first performs the encryption operation at 530 and then performs the storage operation at 525. At 535, the process sends the Keybag produced at 530 to the user computer, and then ends. Along with the Keybag or within the Keybag, the process in some embodiments sends (at 535) other DRM material, as discussed above.

FIG. 6 conceptually illustrates a process 600 that the DRM server set performs in some embodiments when it detects that a new device is being added to a user account. As shown in this figure, the process 600 starts (at 605) when it detects that a new device is being added to a user account. The process can detect this when a new user account is being initially set up or it can detect this when a user computer attempts to synchronize content with a new device.

At 610, the process determines whether a new device can be added to the user account. In some embodiments, this determination involves a determination whether a maximum number of devices had already been added to the user account. If the process determines (at 610) that the device cannot be added, the process ends without adding the device to the user account.

Otherwise, the process identifies (at 615) all the content that was previously purchased or licensed for the user account. For each piece of previously purchased or licensed content, the process then generates (at 620) a key for new device. The process then stores (at 625) each generated key. Next, the process individually encrypts (at 630) each key that it generated at 620. In some embodiments, the process 600 first encrypts each key and then stores the encrypted keys (i.e., first performs the encryption operation at 630 and then performs the storage operation at 625).

At 630, the process then stores the individually encrypted keys in a transport Keybag, which it then sends (at 635) to the user computer associated with the new device. Along with the Keybag or within the Keybag, the process in some embodiments sends (at 635) other DRM material, as discussed above. After 635, the process ends.

FIG. 7 conceptually illustrates a process 700 that a user computer performs when it needs to purchase or license a particular piece of content for a particular user account. As shown in this figure, the process starts (at 705) when the user computer sends a request to the DRM server set to purchase or license a particular piece of content for the particular user account. Next, at 710, the process performs one or more operations to complete the purchase or license transaction.

At 715, the process then receives the requested piece of content in an encrypted format, plus a transport Keybag that includes a cryptographic key for each device that is associated with the particular user account and that can access the encrypted content. In some embodiments, the cryptographic keys are individually encrypted in the transport Keybag.

At 720, the process extracts the cryptographic keys from the transport Keybag and stores these keys in a Keybag of the user computer. The transport Keybag and the computer Keybag have the same format in some embodiments. The process also flags (at 720) a record that it keeps for each particular synchronizing device associated with the particular user account. This flagging is to notify the user computer on the next synchronization with the particular device that the user computer needs to download newly received encrypted content and cryptographic key(s) to the particular device. After 720, the process ends.

IV. Encryption

As described above, several embodiments of the invention provide DRM processes and systems for distributing content. These processes and systems encrypt and decrypt content based on cryptographic keys. Encrypting content entails transforming the content from a decipherable form (called plaintext) into an indecipherable form (called ciphertext) based on one or more cryptographic keys. Decrypting content entails transforming encrypted content into a decipherable from by using one or more cryptographic keys.

An encryption key is a piece of information that controls the operation of a cryptography algorithm. In symmetrical encryption technology, the key that is used to encrypt content is the same key that is used to decrypt content. In asymmetric encryption technology, the same key is not used to encrypt and decrypt the content. For instance, in one scheme, an encrypting device uses a public key of a recipient to encrypt content, and the recipient uses its private key to decrypt the encrypted content.

Many of the features of the embodiments described above can be implemented according to a symmetrical or asymmetrical encryption approach. Also, in some embodiments, the encryption is applied to a binary format of the content. Although the unencrypted binary format of a piece of content may be hard for a human to decipher, it can be deciphered by an application or an operating system. On the other hand, encrypted binary format of a piece of content ideally should not be deciphered by any application or operating system, without first being decrypted by using one or more cryptographic keys.

While the invention has been described with reference to numerous specific details, one of ordinary skill in the art will recognize that the invention can be embodied in other specific forms without departing from the spirit of the invention. For instance, several embodiments described above illustrate the portable devices as devices that only receive DRM content through their synchronization with other user computers. One of ordinary skill will understand, however, that in some embodiments the portable players might directly access the DRM server(s) through a network, in order to obtain DRM content without interfacing with another intermediary computer that can obtain and access the DRM content. Thus, one of ordinary skill in the art would understand that the invention is not to be limited by the foregoing illustrative details, but rather is to be defined by the appended claims.

What is claimed is:

1. A method for distributing keys for accessing content, the method comprising:
   at a digital rights management (DRM) server:
      receiving a request from a particular device to access a particular piece of content;
      identifying a plurality of devices, including the particular device, that are related through one user account that is associated with the particular device;
      for each device, generating a different decryption key for accessing the particular piece of content, wherein each different generated decryption key is specific to one of the devices; and
      providing the different generated decryption keys to the particular device in a first data storage structure; and
   at the particular device:
      storing, one of the generated decryption keys in a second data storage structure, the one of the generated decryption keys being individually encrypted in a same data storage format as the one of the generated decryption keys appears in the first data storage structure provided to the particular device, thereby minimizing exposure of the one of the generated decryption keys during transfer;
      using the one of the generated decryption keys to decrypt and access the particular piece of content stored in an encrypted format on the particular device; and
      supplying, to each respective device of the other devices, the generated decryption key specific to the respective device in a third data storage structure that also stores another generated decryption key specific to the respective device, the other generated decryption key corresponding to another piece of content, wherein each of the other respective devices uses its respective decryption key to decrypt and access the same particular piece of content in the same encrypted format.

2. The method of claim 1, wherein the third data storage structure has the same data storage format as the first and second data storage structures.

3. The method of claim 1, wherein the particular device stores the provided decryption keys in a keybag along with other sets of decryption keys for accessing other pieces of content on the plurality of devices.

4. The method of claim 1 further comprising storing the generated decryption keys in the first data storage structure prior to providing the generated decryption keys to the particular device, wherein the generated decryption keys are provided to the particular device by providing the first data storage structure.

5. The method of claim 4, wherein the first data storage structure is a transport keybag.

6. The method of claim 1, wherein providing the different generated decryption keys to the particular device further comprises providing the particular piece of content to the particular device in the encrypted format.

7. A method comprising:
   from a first device, sending a request to a digital rights management (DRM) server for a piece of content;
   at the first device, receiving from the DRM server, the piece of content in an encrypted format and a set of different keys for the first device and a set of other devices, each key generated specifically for decrypting and accessing the piece of encrypted content on one of the other devices;
   at the first device, using the key specific to the first device to decrypt and access the encrypted content; and
   from the first device, supplying to each other device the received key specific to the other device without supplying to the other device any other key in the received set of different keys, wherein the other device uses the key supplied from the first device to decrypt and access the piece of encrypted content, wherein the received key specific to at least one other device is supplied to the at least one other device along with another received key specific to the at least one other device, the other received key corresponding to another piece of encrypted content, and the key and the other received key each being individually encrypted such that the at least one other device can decrypt and use the key without decrypting the other received key.

8. The method of claim 7, wherein the set of different keys are received from the DRM server in a first data storage structure.

9. The method of claim 8 further comprising extracting the keys from the first data storage structure.

10. The method of claim 8 further comprising storing a first key specific to the first device in a second data storage structure at the first device, the second data storage structure having a same data storage format as the first data storage structure.

11. A non-transitory machine readable medium storing a computer program for execution by at least one processing unit of a first device, the computer program comprising sets of instructions for:
from the first device, requesting a piece of content from a set of servers;
at the first device, receiving the piece of content in an encrypted format and a set of different keys for the first device and a set of other devices, each key generated specifically for decrypting and accessing the piece of encrypted content on one of the other devices;
at the first device, using the key specific to the first device to decrypt and access the encrypted content; and
from the first device, distributing to each other device the received key specific to the other device along with at least one other received key specific to the other device without supplying to the other device any other key in the received set of different keys, wherein the key and the at least one other received key are individually encrypted and the other device is configured to decrypt and use the key supplied from the first device to decrypt and access the piece of encrypted content, without decrypting the other received key.

12. The non-transitory machine readable medium of claim 11, wherein the computer program further comprises a set of instructions for storing each of the different keys in a different transport keybag along with the at least one other received key before distributing the key and the at least one other received key to the other device to which the key and the at least one other received key is specific.

13. The non-transitory machine readable medium of claim 12, wherein the set of instructions for distributing a particular key, from the first device to the other device to which the key is specific comprises a set of instructions for supplying the key to the other device in the respective transport keybag along with the at least one other key.

14. The non-transitory machine readable medium of claim 13, wherein the set of different keys are received in a data storage structure, wherein the data storage structure and the transport keybags have a same data storage format.

15. A digital rights management (DRM) system comprising:
at least one server configured to:
identify a plurality of devices that are related through one user account; and
generate a different key for each related device, wherein each generated key is specific to one of the devices and is for accessing a particular piece of content on the device;
a first device of the plurality of related devices, the first device configured to:
receive, from the at least one server, (i) the particular piece of content in an encrypted format and (ii) a first data storage structure that includes the generated keys for accessing the particular piece of encrypted content; and
use one of the generated keys to decrypt and access the particular piece of content on the first device; and
a set of related devices of the plurality of related devices, each respective related device configured to:
receive, from the first device, a second data storage structure that includes the generated key specific to the respective related device and another generated decryption key specific to the respective related device, the other generated decryption key corresponding to another piece of content, and the generated key being individually encrypted and stored in the second data storage structure in a same format that it appears in the first data storage structure; and
use its specific key to decrypt and access the piece of content on the respective related device.

16. The DRM system of claim 15, wherein the at least one server is further configured to:
store the generated keys in a data storage structure; and
provide the generated keys in the data storage structure to the first device.

17. The DRM system of claim 15, wherein the at least one server comprises a first server for distributing the generated keys and a second server for distributing the particular piece of content in the encrypted format.

18. The DRM system of claim 15, wherein the first device is further configured to:
store the received generated keys along with other sets of keys for accessing other pieces of content on the plurality of devices.

19. A first device comprising:
a memory; and
at least one processor configured to:
request a piece of content from a set of servers;
receive the piece of content in an encrypted format and a set of different keys for the first device and a set of other devices, each key generated specifically for decrypting and accessing the piece of encrypted content on one of the other devices;
use the key specific to the first device to decrypt and access the encrypted content; and
distribute to each other device the received key specific to the other device along with at least one other received key specific to the other device without supplying to the other device any other key in the received set of different keys, wherein the key and the at least one other received key are individually encrypted and the other device is configured to decrypt and use the key supplied from the first device to decrypt and access the piece of encrypted content, without decrypting the other received key.

20. The first device of claim 19, wherein the at least one processor is further configured to:
store each of the different keys in a different transport keybag along with the at least one other received key before distributing the key and the at least one other received key to the other device to which the key and the at least one other received key is specific.

21. The first device of claim 20, wherein the at least one processor is further configured to distribute to each other device the received key specific to the other device along with the at least one other received key specific to the other device by supplying the key to the other device in the respective transport keybag along with the at least one other received key.

22. The first device of claim 21, wherein the set of different keys are received in a data storage structure, wherein the data storage structure and the transport keybags have a same data storage format.

23. The first device of claim 22, wherein the at least one processor is further configured to:
   extract the set of different keys from the data storage structure.

\* \* \* \* \*